United States Patent
Miyazaki et al.

[11] Patent Number: 6,044,044
[45] Date of Patent: Mar. 28, 2000

[54] MAGNETO-OPTICAL RECORDING MEDIUM HAVING AN ENLARGED MAGNETIC DOMAIN IN THE AMPLIFIER LAYER DURING READ-OUT

[75] Inventors: Shinji Miyazaki; Hiroyasu Inoue; Jiro Yoshinari, all of Nagano, Japan

[73] Assignee: TDK Corporation, Tokyo, Japan

[21] Appl. No.: 09/106,089

[22] Filed: Jun. 29, 1998

[30] Foreign Application Priority Data

Jul. 4, 1997 [JP] Japan ................................. 9-194809

[51] Int. Cl.$^7$ ................................. G11B 11/00
[52] U.S. Cl. ........................... 369/13; 428/694 ML
[58] Field of Search .................... 369/13, 14, 110, 369/116; 360/59, 114; 365/122; 428/694 ML, 694 MM, 694 EC

[56] References Cited

U.S. PATENT DOCUMENTS

| | | | |
|---|---|---|---|
| 5,640,374 | 6/1997 | Hirokane et al. | 369/13 |
| 5,659,537 | 8/1997 | Hirokane et al. | 369/275.2 |
| 5,684,764 | 11/1997 | Hirokane et al. | 369/13 |
| 5,838,645 | 11/1998 | Hirokane et al. | 369/13 |

FOREIGN PATENT DOCUMENTS 08007350A 1/1996 Japan .

OTHER PUBLICATIONS

30a–NF–2; External Magentic Field Characteristics of Magnetic Expansion Readout; N. Takagi et al, Mar. 30, 1997.

30a–NF–4; Magentic Expanding MO Readout Using Pulsed–Laser Beam; Hitachi Maxell, Ltd. et al, Mar. 30, 1997.

30a–NF–5; Magnetic Domain Expansion for o.1 um Domain Recorded By Magnetic Field Modulation; Mammos. H. Awano et al, Mar. 30, 1997.

*Primary Examiner*—Tan Dinh
*Attorney, Agent, or Firm*—Laubscher & Laubscher; R. J. Lasker, Esq.

[57] ABSTRACT

A magneto-optical recording medium comprises a substrate, and a magnetic multilayer 4 on a surface side thereof. The magnetic multilayer comprises an amplifying layer $A_1$ and a recording layer $R_2$ which are laminated together and are each a magnetic layer. A nonmagnetic intermediate layer $I_{12}$ is interleaved between the amplifying layer $A_1$ and the recording layer $R_2$ to couple them magnetostatically. The nonmagnetic intermediate layer $I_{12}$ is made up of a metal oxide and has a thickness of 2 to 30 nm. The magnetic field intensity needed for magnetic field modulation reading or light modulation reading can be lowered.

6 Claims, 1 Drawing Sheet

MAGNETO-OPTICAL RECORDING MEDIUM HAVING AN ENLARGED MAGNETIC DOMAIN IN THE AMPLIFIER LAYER DURING READ-OUT

BACKGROUND OF THE INVENTION

The present invention relates to a magneto-optical recording medium capable of enlarging recorded magnetic domains for reading purposes.

In a magneto-optical recording medium, a magnetic thin film thereof is locally heated by laser beam irradiation or other light irradiation to decrease its coercive force. Then, an external magnetic field is applied to the magnetic thin film to reverse the direction of magnetization of the irradiated spots or maintain the initial magnetization direction, thereby forming magnetic domains (recorded marks). The direction of magnetization of the magnetic domains is read out by the Kerr or Faraday effect.

In an ordinary magneto-optical recording medium, the available density of readable magnetic domains is limited by the spot diameter of the laser beam used for reading, and so it is impossible to read magnetic domains having a diameter smaller than the half of the laser beam spot diameter.

For a magneto-optical recording medium capable of reading magnetic domains having a diameter smaller than the half of laser beam spot diameter, for instance, JP-A 8-7350 discloses a magneto-optical recording medium capable of enlarging recorded magnetic domains. This magneto-optical recording medium comprises a triple-layered recording film comprising, in order from an substrate side, a first magnetic layer, a second magnetic layer, and a third magnetic layer which are exchange coupled together. Upon reading, the substrate of the medium is irradiated with a laser beam while a reading magnetic field is applied to the recording film of the medium. The third magnetic layer holds recorded magnetic domains, which are copied by laser beam irradiation to the second, and first magnetic layers. The copied magnetic domains are enlarged by the application of a reading magnetic field in the longitudinal direction of each magnetic layer. The enlarged, copied magnetic domains are read out as is the case with a conventional magneto-optical recording medium. After the reading of the enlarged, copied magnetic domains has finished, an erasing magnetic field opposite in direction to the reading magnetic field is applied to erase off the copied magnetic domains for the next reading of adjacent recorded magnetic domains. Thus, upon reading of this magneto-optical recording medium, a modulated magnetic field comprising a reading magnetic field and an erasing magnetic field is applied thereto. By repetition of such a process, it is possible to read minute magnetic domains unreadable so far in the art. Furthermore, this method does not only achieve high resolution upon reading, but also enables output signal intensity to be in itself augmented because the magnetic domains are actually enlarged. Hereinafter, the reading process capable of reading minute magnetic domains by enlargement of the copied magnetic domains will be called a reading process by enlargement of magnetic domains.

In the magneto-optical recording medium set forth in the aforesaid publication, however, the magnetic film of an exchange coupled multilayer structure is used. In other words, to enlarge copied magnetic domains, it is required to overcome exchange force between adjacent magnetic layers; it is required to use a large reading magnetic field. To achieve recording density, and transfer rate increases, it is required to allow a modulated magnetic field comprising a reading magnetic field and an erasing magnetic field to have a high frequency. However, the larger the magnetic field generated by a modulated magnetic field generating means, the more difficult is it to allow the modulated magnetic field generating means to have a high frequency. Thus, the use of the exchange coupled magnetic film is an obstacle to achieving recording density, and transfer rate improvements.

SUMMARY OF THE INVENTION

One object of the present invention is to provide a magneto-optical recording medium of the type that comprises a magnetic layer of a multilayer structure and, upon application of a modulated magnetic field thereto, effects reading through a series of processes involving "copy of recorded magnetic domains → enlargement of copied magnetic domains → reading of copied magnetic domains diminishing and vanishing of copied magnetic domains", wherein the enlargement of copied magnetic domains is so facilitated that the modulated magnetic field needed for reading can be lowered with the result that the modulated magnetic field is easily allowed to have a high frequency, thereby achieving recording density, and transfer rate improvements. Another object of the present invention is to provide a magneto-optical recording medium which, upon irradiated with a modulated laser beam while a magnetic field (a reading magnetic field) is applied thereto in one direction, effects reading through a series of processes involving "copy of recorded magnetic domains→enlargement of copied magnetic domains→reading of copied magnetic domains→diminishing and vanishing of copied magnetic domains", wherein the enlargement of copied magnetic domains is so facilitated that the necessary reading magnetic field intensity can be lowered.

The aforesaid object is achieved by the embodiments of the invention defined below as (1) to (4).

(1) A magneto-optical recording medium, which comprises:

a substrate, and a magnetic multilayer on a surface side of said substrate, said magnetic multilayer comprising an amplifying layer and a recording layer which are laminated together and are each a magnetic layer, with a nonmagnetic intermediate layer interleaved therebetween, said amplifying layer and said recording layer being magnetostatically coupled together, and said nonmagnetic intermediate layer being made up of a metal oxide and having a thickness of 2 to 30 nm.

(2) The magneto-optical recording medium according to (1), wherein said amplifying layer is mainly composed of dysprosium, iron and/or cobalt, and said recording layer is mainly composed of at least one element selected from a group consisting of gadolinium, terbium, and dysprosium, and iron and/or cobalt.

(3) The magneto-optical recording medium according to (1) or (2), which effects reading through a process wherein, upon laser beam irradiation and application of a reading magnetic field thereto, a recorded magnetic domain formed in said recording layer is copied to said amplifying layer to form a copied magnetic domain therein while, at the same time, said copied magnetic domain is enlarged, then said copied magnetic domain is read out, and then an erasing magnetic field is applied thereto in a reverse direction to said reading magnetic field so that said copied magnetic domain diminishes to nil.

(4) The magneto-optical recording medium according to (1) or (2), which effects reading through a process wherein, upon laser beam irradiation and application of a reading magnetic field thereto, a recorded magnetic domain formed in said recording layer is copied to said amplifying layer to form a copied magnetic domain therein while, at the same time, said copied magnetic domain is enlarged, then said copied magnetic domain is read out, and then said copied magnetic domain diminishes to nil upon interruption of said laser beam irradiation or a decrease in laser beam power.

BRIEF DESCRIPTION OF THE DRAWINGS

These and further features of the present invention will be apparent with reference to the following description and drawings, in which.

EXPLANATION OF THE PREFERRED EMBODIMENTS

Figure 1:
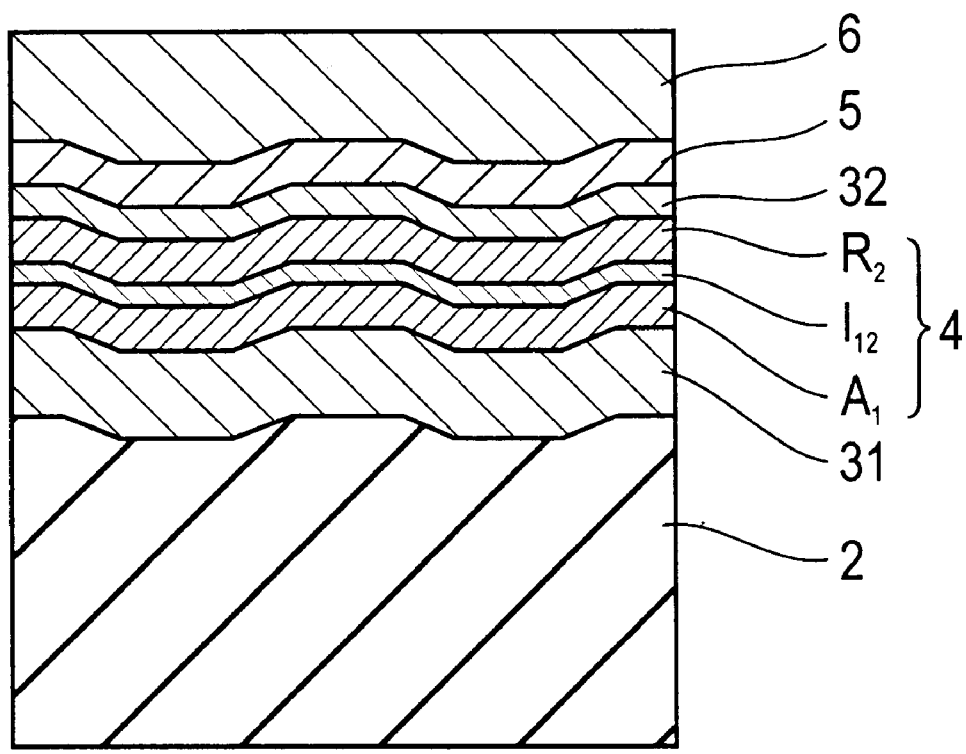
FIG. 1 is a sectional schematic illustrative of one exemplary architecture of the magneto-optical recording medium of the present invention.

In the present invention, the nonmagnetic intermediate layer having a given thickness is interleaved between the amplifying layer and the recording layer. Due to the presence of the nonmagnetic intermediate layer having a given thickness, a suitable magnitude of magnetostatic force is exerted between the amplifying layer and the recording layer during the copy and enlargement of magnetic domains while exchange force is not substantially exerted therebetween. In general, magnetostatic force is weaker than exchange force. The recording magnetic domain copied to the amplifying layer with magnetostatic force can be enlarged by a small applied magnetic field because exchange force is not substantially exerted thereon. Consequently, the reading magnetic field intensity can be lowered with the result that the modulated magnetic field applied for reading is easily allowed to have a high frequency so that some recording density, and transfer rate improvements can be easily achieved.

The present invention is applicable to not only a magneto-optical recording medium of the type that enlarges and reads magnetic domains upon the application of a modulated magnetic field thereto but also a magneto-optical recording medium of the type that enlarges and reads magnetic domains upon modulated laser beam irradiation while a magnetic filed is applied thereto in one direction. In the latter case, too, it is possible to achieve the same effect on a lowering of the reading magnetic field intensity.

In the present invention, the nonmagnetic intermediate layer is made up of a metal oxide. Even when a nonmagnetic material other than the metal oxide is used, the effect due to magnetostatic coupling may be obtainable. For instance, when the nonmagnetic intermediate layer is made up of a metal nitride, however, the magnetic properties of the magnetic layers become worse by reason of the diffusion of nitrogen into them. The nonmagnetic intermediate layer made up of the metal oxide is preferred for production cost reductions, because it can be very easily formed by using a sputtering target for magnetic layer formation, and introducing oxygen gas in a sputtering atmosphere. However, it is noted that a nonmagnetic intermediate layer made up of other oxides such as $Al_2O_3$, and $SiO_2$, too, is acceptable in the present invention.

If, in the present invention, dysprosium or Dy is used as the major component element for the amplifying layer, then it is much easier to enlarge the magnetic domain copied to the amplifying layer as compared with the case where only magnetostatic coupling is relied upon.

In this connection, "the 44th Japan Society of Applied Physics Meeting", preprints, 30a-NF-2, 30a-NF-4, and 30a-NF-5, 1977, report for magneto-optical recording media capable of enlarging magnetic domains for reading and making use of magnetostatic coupling. However, the magneto-optical recording medium set forth in 30a-NF-2 comprises a GdFeCo/SiN/Al/TbFeCo structure, viz., a structure using a nitride layer as a nonmagnetic intermediate layer, and so is structurally different from that of the present invention. This preprint is silent about the thickness of the nonmagnetic intermediate layer. Preprint 30a-NF-4 refers to the magnetostatic coupling of a reading layer (corresponding to the amplifying layer according to the present invention) with a recording layer, but discloses nothing about the composition, and thickness of a nonmagnetic intermediate layer. Preprint 30a-NF-5 refers to the use of a disk with an enlarging and reading layer of GdFeCo coupled with a recording layer of TbFeCo, but again says nothing about the composition, and thickness of a nonmagnetic intermediate layer.

As can be seen from FIG. 1, a magneto-optical recording medium according to the present invention comprises a substrate 2 and a magnetic multilayer 4 located on a surface side thereof, which comprises an amplifying layer $A_1$ and a recording layer $R_2$, each being a magnetic layer. Between the amplifying layer $A_1$ and the recording layer $R_2$, there is interleaved a nonmagnetic intermediate layer $I_{12}$, by which the amplifying layer $A_l$ and the recording layer $R_2$ are magnetostatically coupled together.

In this magneto-optical recording medium, a recorded magnetic domain is formed in the recording layer $R_2$ in a magnetic field modulation or light modulation mode. In the present invention, this recorded magnetic domain is read by the magnetic field modulation or light modulation process which will be described.

In the magnetic field modulation reading process, a reading magnetic field is first applied to the magnetic multilayer 4 while irradiated with a laser beam. This in turn causes the recorded magnetic domain to be copied to the amplifying layer $A_1$ where a copied magnetic domain is formed. At the same time, the copied magnetic domain is enlarged within the plane of the amplifying layer $A_1$. Then, the enlarged, copied magnetic domain is read out, making use of the Kerr or Faraday effect. Finally, an erasing magnetic field is applied to the magnetic multilayer in the reverse direction to the reading magnetic field, thereby allowing the enlarged, copied magnetic domain to diminish, and vanish. In other words, a modulated magnetic field composed of a reading magnetic field and an erasing magnetic field is applied to the medium for reading. It is noted that laser beam irradiation may take place continuously or in a pulse-wise manner.

In the light modulation reading process, on the other hand, the enlarged, copied magnetic domain is read out, after which laser beam irradiation is interrupted or laser beam power is decreased, thereby diminishing, and vanishing the copied magnetic domain in the amplifying layer $A_1$. That is, in the light modulation reading process, there is no need of applying a modulated magnetic field. The magnetic multilayer is irradiated with a pulse modulated laser beam while a reading magnetic field is applied thereto in one direction, so that the copy of magnetic domains, and the enlargement, reading, and vanishing of copied magnetic domains can take place continuously.

In these reading processes, the condition for copying, by means of a magnetostatic field, the recorded magnetic domain from the recording layer $R_2$ to the amplifying layer $A_1$ whose coercive force is decreased by laser beam heating, and then enlarging the copied magnetic domain by means of the reading magnetic field is given by $$Hr > HC_{A1} - Hd_{A1} + HS_{A1R2} + H_{wA1} \quad \text{condition I}$$

Here Hr is a reading magnetic field intensity, $HC_{A1}$ is a coercive force of the amplifying layer $A_1$, $Hd_{A1}$ is a demagnetizing field of the amplifying layer $A_1$, $HS_{A1R2}$ is a magnetostatic field between the amplifying layer $A_1$ and the recording layer $R_2$, and $Hw_{A1}$ is the effective magnetic field caused by the Bloch wall on the amplifying layer $A_1$.

To place the exchange force exerted between the amplifying layer and the recording layer on a negligible level as compared with magnetostatic force, it is required to interleave a nonmagnetic intermediate region having at least a given thickness between the amplifying layer and the recording layer. In the present invention, the nonmagnetic intermediate layer made up of a metal oxide is employed for such a nonmagnetic intermediate region. Preferred as the metal oxide for this nonmagnetic intermediate layer is an oxide of the metal used for the magnetic layers, as already mentioned, for the reason of ease of formation. Such a metal includes a rare earth metal element and a transition metal element. By way of example, at least one selected from the group consisting of terbium or Tb, gadolinium or Gd, and dysprosium or Dy, and at least one of iron or Fe, and cobalt or Co are preferred.

In general, the magnitude of $HS_{A1R2}$ in condition I is roughly proportional to the saturation magnetization of the recording layer $R_2$, and inversely proportional to the thickness of the nonmagnetic intermediate layer. It is thus required to vary the thickness of the nonmagnetic intermediate layer, thereby regulating magnetostatic force to a suitable magnitude. In the present invention, the thickness of the nonmagnetic intermediate layer is 2 to 30 nm, and preferably 5 to 25 nm. Too thin a nonmagnetic intermediate layer causes the influence of exchange force to become significant, and so a magnetic field having high intensity is needed for the enlargement of the copied magnetic domains. Too thick a nonmagnetic intermediate layer, on the other hand, causes $HS_{A1R2}$ to become too small, rendering copy of magnetic domains from the recording layer $R_2$ to the amplifying layer $A_1$ insufficient.

In the present invention, it is noted that any nitride is not used at all. This is because when the nonmagnetic intermediate layer is made up of a material other than the metal oxide, for instance, a metal nitride, the magnetic properties of the magnetic layers become worse due to the diffusion of nitrogen into them, as already explained.

Structure of Each Magnetic Layer

Structural factors of each magnetic layer such as composition and thickness may be appropriately determined in such a way as to satisfy the aforesaid conditions, and so are not critical. However, the following structures are preferred.

Amplifying Layer $A_1$

This layer comprises a rare earth metal element and a transition metal element as major components. A preferable rare earth metal element is Dy because its wall energy is so low that magnetic domains can be easily enlarged or diminished. Preferably, the amplifying layer contains at least Fe and/or Co as the transition metal element. A thickness of 10 to 100 nm is preferred. Too thin an amplifying layer results in a C/N drop because information of other magnetic layers may be read out through it during reading, whereas too thick an amplifying layer renders it impossible to increase the interface wall exchange force magnetic field for it, making copy of magnetic domains insufficient. Preferably, the amplifying layer has a Curie temperature of 80 to 300° C.

Recording Layer $R_2$

This layer comprises a rare earth metal element and a transition metal element as major components. Preferably, the recording layer comprises at least one element selected from the group consisting of Gd, Tb, and Dy, and especially Tb as the rare earth metal element, and at least Fe and Co as the transition metal element. A thickness of at least 10 nm is preferred. Too thin a recording layer makes recording substantially impossible because the recorded magnetic domains are unstable. Although there is no upper limit on thickness, a thickness exceeding 100 nm is unnecessary because of added costs. A Curie temperature of 80 to 400° C. is preferred.

Dielectric Layers 31, 32

In the magneto-optical recording medium constructed according to the present invention, usually, dielectric layers are provided between the substrate 2 and the magnetic multilayer 4; that is, a first dielectric layer 31 is provided on the back side of the magnetic multilayer 4 while a second dielectric layer 32 is provided on the surface side of the magnetic multilayer 4. These dielectric layers serve as a protector for the magnetic multilayer, and as an enhancer for the Kerr or Faraday effect. As is the case with an ordinary magneto-optical recording medium, each dielectric layer may be made up of various metal oxides, nitrides, and sulfides or a mixture of these metal compounds. Usually, the first dielectric layer 31 has a thickness of the order of 30 to 300 nm while the second dielectric layer 32 has a thickness of the order of 10 to 100 nm.

Reflective Layer 5

If required, a reflective layer 5 is provided on the surface side of the second dielectric layer 32. This reflective layer also serves as a heat-radiating layer. The reflective layer has usually a thickness of the order of 10 to 200 nm.

Protective Layer 6

Usually, a protective layer 6 formed of resin is provided in the form of the outermost layer of the medium. The protective layer has usually a thickness of the order of 1 to 100 $\mu$m.

Substrate 2

In the magneto-optical recording medium of the present invention wherein reading light is incident on the back side of the substrate 2, the substrate should be substantially transparent to the reading light. For this reason, the substrate is preferably constructed of resin or glass.

EXAMPLE

Example 1

(Magnetic Field Modulation Reading)

A magneto-optical recording disk sample of the architecture shown in FIG. 1 was prepared as follows.

Substrate 2

For this, a disk form of polycarbonate (with a track pitch of 1.1 $\mu$m) having an outer diameter of 120 mm and a thickness of 1.2 mm was used.

First Dielectric Layer 31

The first dielectric layer of 60 nm in thickness was prepared by forming a silicon nitride film by a sputtering process using an Si target in a (Ar+$N_2$) atmosphere.

Amplifying Layer $A_1$

This magnetic layer was prepared by a sputtering process using an alloy target in an Ar atmosphere. The thickness was 30 nm, with the composition shown in the following tables.

Intermediate Layer $I_{12}$

A nonmagnetic intermediate layer made up of an oxide was formed by a sputtering process using an alloy target in a (Ar +$O_2$) atmosphere. A nonmagnetic intermediate layer made up of a nitride was formed by a sputtering process using an alloy or Si target in a (Ar+$N_2$) atmosphere. A magnetic intermediate layer made up of an alloy was formed by a sputtering process using an alloy target in an Ar atmosphere. It is noted that when a magnetic intermediate layer is provided, exchange coupling takes place during the copy, and enlargement of magnetic domains. The composition, and thickness of each intermediate layer are shown in the following tables.

Recording Layer $R_2$

This layer was formed by a sputtering process using an alloy target in an Ar atmosphere. The thickness was 40 nm, with the composition shown in the following tables.

Second Dielectric Layer 32

The second dielectric layer of 30 nm was prepared by forming a silicon nitride film by a sputtering process using an Si target in a (Ar+$N_2$) atmosphere.

Protective Layer of Resin

A protective layer of about 5 μm in thickness was prepared by coating an ultraviolet radiation-curing type resin by a spin coating process, and curing the resin by exposure to ultraviolet radiation.

Evaluation of Characteristics

The properties of these samples were evaluated with an optical disk-evaluating device under the following conditions:

Recording Conditions
  Laser wavelength: 680 nm
  Numerical aperture NA: 0.55
  Recording power: 10 mW
  Recording magnetic field: 300 Oe (a modulated magnetic field having a frequency of 2 MHz)
  Linear velocity: 2 m/s Reading Conditions (Magnetic Field Modulation)
  Laser wavelength: 680 nm
  Numerical aperture NA: 0.55
  Reading power: 1.5 mW
  Reading.erasing magnetic field: an alternating magnetic field having a frequency of 4 MHz
  Linear velocity: 2 m/s Reading was carried out at varied reading.erasing magnetic field intensities to find the intensities of "enlarging magnetic field", "inverting magnetic field", and "erasing magnetic field" as well as S/N upon the application of the "enlarging magnetic field". The results are set out in the following tables.

By the term "enlarging magnetic field" is intended a magnetic field whereby recorded magnetic domains can be copied to the amplifying layer, and the thus copied magnetic domains can be enlarged. More specifically, the term "enlarging magnetic field" refers to a magnetic field intensity at which S/N reaches a maximum.

By the term "inverting magnetic field" is intended a magnetic field whereby the overall magnetization of the amplifying layer is inverted. More specifically, the term "inverting magnetic field" refers to a magnetic field intensity whereby S/N is again brought down to less than 30 dB when the applied magnetic field is increased from the "enlarging magnetic field".

By the term "erasing magnetic field" is intended a magnetic field whereby the copied magnetic domains in the amplifying layer are vanished. More specifically, the term "erasing magnetic field" refers to a magnetic field intensity whereby S/N is brought down to less than 30 dB when a magnetic field is applied to the once enlarged magnetic domains in the reverse direction to the enlarging magnetic field. The "erasing magnetic field is marked with a minus sign because it is in the reverse direction to the enlarging magnetic field, and the inverting magnetic field.

It is noted that when the copied magnetic domains are not enlarged, only the maximum value for S/N, inverting magnetic field intensity, and erasing magnetic field intensity are shown.

TABLE 1

Magnetic Field Modulation
$A_1$ = DyFeCo, $R_2$ = TbFeCo, and $I_{12}$ = TbFeCo Oxide

| Sample No. | $I_{12}$ Thickness (nm) | S/N (dB) | Enlarging MF (Oe) | Inverting MF (Oe) | Erasing MF (Oe) |
|---|---|---|---|---|---|
| 101 | 2 | 47 | 80 | 130 | −80 |
| 102 | 5 | 48 | 80 | 130 | −80 |
| 103 | 10 | 48 | 70 | 120 | −70 |
| 104 | 15 | 48 | 70 | 120 | −70 |
| 105 | 20 | 48 | 60 | 110 | −60 |
| 106 | 25 | 48 | 60 | 110 | −60 |
| 107 | 30 | 47 | 50 | 100 | −50 |
| 108 (comp.) | 1* | 47 | 100 | 150 | −100 |
| 109 (comp.) | 35* | 35 | — | 50 | −50 |

MF: magnetic field
*: deviations from the inventive scope

TABLE 2

Magnetic Field Modulation
$A_1$ = DyFe, $R_2$ = TbFeCo, and $I_{12}$ = TbFeCo Oxide

| Sample No. | $I_{12}$ Thickness (nm) | S/N (dB) | Enlarging MF (Oe) | Inverting MF (Oe) | Erasing MF (Oe) |
|---|---|---|---|---|---|
| 201 | 2 | 47 | 80 | 110 | −80 |
| 202 | 5 | 47 | 70 | 110 | −70 |
| 203 | 10 | 47 | 70 | 100 | −70 |
| 204 | 15 | 47 | 60 | 100 | −60 |
| 205 | 20 | 47 | 60 | 90 | −60 |
| 206 | 25 | 47 | 50 | 80 | −50 |
| 207 | 30 | 46 | 50 | 80 | −50 |
| 208 (comp.) | 1* | 47 | 100 | 130 | −100 |
| 209 (comp.) | 35* | 30 | — | 50 | −50 |

MF: magnetic field
*: deviations from the inventive scope

TABLE 3

Magnetic Field Modulation
$A_1$ = DyCo, $R_2$ = TbFeCo, and $I_{12}$ = TbFeCo Oxide

| Sample No. | $I_{12}$ Thickness (nm) | S/N (dB) | Enlarging MF (Oe) | Inverting MF (Oe) | Erasing MF (Oe) |
|---|---|---|---|---|---|
| 301 | 2 | 48 | 80 | 130 | −80 |
| 302 | 5 | 48 | 80 | 130 | −80 |
| 303 | 10 | 49 | 80 | 130 | −80 |
| 304 | 15 | 49 | 70 | 120 | −70 |
| 305 | 20 | 49 | 70 | 110 | −70 |
| 306 | 25 | 49 | 60 | 80 | −60 |
| 307 | 30 | 48 | 60 | 80 | −60 |
| 308 (comp.) | 1* | 48 | 120 | 180 | −120 |
| 309 (comp.) | 35* | 41 | — | 50 | −50 |

MF: magnetic field
*: deviations from the inventive scope

TABLE 4

Magnetic Field Modulation
$A_1$ = DyFe, $R_2$ = DyFeCo, and $I_{12}$ = DyFeCo Oxide

| Sample No. | $I_{12}$ Thickness (nm) | S/N (dB) | Enlarging MF (Oe) | Inverting MF (Oe) | Erasing MF (Oe) |
|---|---|---|---|---|---|
| 401 | 2 | 46 | 80 | 130 | −80 |
| 402 | 5 | 46 | 80 | 120 | −80 |
| 403 | 10 | 46 | 70 | 120 | −70 |
| 404 | 15 | 46 | 70 | 110 | −70 |
| 405 | 20 | 46 | 60 | 110 | −60 |
| 406 | 25 | 46 | 60 | 100 | −60 |
| 407 | 30 | 46 | 50 | 90 | −50 |
| 408 (comp.) | 1* | 46 | 100 | 150 | −100 |
| 409 (comp.) | 35* | 42 | — | 50 | −50 |

MF: magnetic field
*: deviations from the inventive scope

TABLE 5

Magnetic Field Modulation
$A_1$ = DyFe, $R_2$ = GdTbFeCo, and $I_{12}$ = GdTbFeCo Oxide

| Sample No. | $I_{12}$ Thickness (nm) | S/N (dB) | Enlarging MF (Oe) | Inverting MF (Oe) | Erasing MF (Oe) |
|---|---|---|---|---|---|
| 501 | 2 | 47 | 80 | 130 | −80 |
| 502 | 5 | 47 | 80 | 120 | −80 |
| 503 | 10 | 47 | 70 | 120 | −70 |
| 504 | 15 | 47 | 70 | 120 | −70 |
| 505 | 20 | 47 | 60 | 110 | −60 |
| 506 | 25 | 46 | 60 | 100 | −60 |
| 507 | 30 | 46 | 50 | 100 | −50 |
| 508 (comp.) | 1* | 47 | 100 | 150 | −100 |
| 509 (comp.) | 35* | 40 | — | 50 | −50 |

MF: magnetic field
*: deviations from the inventive scope

TABLE 6

Magnetic Field Modulation
$A_1$ = DyFe, $R_2$ = TbCo, and $I_{12}$ = TbCo Oxide

| Sample No. | $I_{12}$ Thickness (nm) | S/N (dB) | Enlarging MF (Oe) | Inverting MF (Oe) | Erasing MF (Oe) |
|---|---|---|---|---|---|
| 601 | 2 | 47 | 80 | 130 | −80 |
| 602 | 5 | 47 | 70 | 120 | −70 |
| 603 | 10 | 47 | 70 | 110 | −70 |
| 604 | 15 | 47 | 60 | 110 | −60 |
| 605 | 20 | 47 | 60 | 100 | −60 |
| 606 | 25 | 46 | 50 | 100 | −50 |
| 607 | 30 | 46 | 50 | 90 | −50 |
| 608 (comp.) | 1* | 47 | 100 | 150 | −100 |
| 609 (comp.) | 35* | 41 | — | 50 | −50 |

MF: magnetic field
*: deviations from the inventive scope

TABLE 7

Magnetic Field Modulation
$A_1$ = DyFe, $R_2$ = TbFe, and $I_{12}$ = TbFe Oxide

| Sample No. | $I_{12}$ Thickness (nm) | S/N (dB) | Enlarging MF (Oe) | Inverting MF (Oe) | Erasing MF (Oe) |
|---|---|---|---|---|---|
| 701 | 2 | 48 | 80 | 130 | −80 |
| 702 | 5 | 48 | 80 | 120 | −80 |
| 703 | 10 | 48 | 70 | 120 | −70 |
| 704 | 15 | 48 | 70 | 110 | −70 |
| 705 | 20 | 47 | 60 | 110 | −60 |
| 706 | 25 | 46 | 60 | 100 | −60 |
| 707 | 30 | 46 | 50 | 100 | −50 |
| 708 (comp.) | 1* | 48 | 100 | 150 | −100 |
| 709 (comp.) | 35* | 40 | — | 50 | −50 |

MF: magnetic field
*: deviations from the inventive scope

TABLE 8

Magnetic Field Modulation
$A_1$ = GdFeCo, $R_2$ = TbFeCo, and $I_{12}$ = TbFeCo Oxide

| Sample No. | $I_{12}$ Thickness (nm) | S/N (dB) | Enlarging MF (Oe) | Inverting MF (Oe) | Erasing MF (Oe) |
|---|---|---|---|---|---|
| 801 | 2 | 44 | 120 | 160 | −120 |
| 802 | 5 | 45 | 120 | 160 | −120 |
| 803 | 10 | 45 | 110 | 160 | −110 |
| 804 | 15 | 45 | 110 | 150 | −110 |
| 805 | 20 | 45 | 110 | 150 | −110 |
| 806 | 25 | 45 | 110 | 150 | −110 |
| 807 | 30 | 43 | 100 | 150 | −100 |
| 808 (comp.) | 1* | 45 | 130 | 180 | −120 |
| 809 (comp.) | 35* | 35 | — | 100 | −100 |

MF: magnetic field
*: deviations from the inventive scope

TABLE 9

Magnetic Field Modulation
$A_1$ = GdFe, $R_2$ = TbFeCo, and $I_{12}$ = TbFeCo Oxide

| Sample No. | $I_{12}$ Thickness (nm) | S/N (dB) | Enlarging MF (Oe) | Inverting MF (Oe) | Erasing MF (Oe) |
|---|---|---|---|---|---|
| 901 | 2 | 45 | 110 | 150 | −110 |
| 902 | 5 | 46 | 110 | 150 | −110 |
| 903 | 10 | 46 | 100 | 150 | −100 |
| 904 | 15 | 46 | 100 | 140 | −100 |
| 905 | 20 | 46 | 100 | 140 | −100 |
| 906 | 25 | 46 | 100 | 140 | −100 |
| 907 | 30 | 45 | 90 | 140 | −90 |
| 908 (comp.) | 1* | 45 | 120 | 170 | −110 |
| 909 (comp.) | 35* | 30 | — | 100 | −100 |

MF: magnetic field
*: deviations from the inventive scope

TABLE 10

Magnetic Field Modulation
$A_1$ = GdCo, $R_2$ = TbFeCo, and $I_{12}$ = TbFeCo Oxide

| Sample No. | $I_{12}$ Thickness (nm) | S/N (dB) | Enlarging MF (Oe) | Inverting MF (Oe) | Erasing MF (Oe) |
|---|---|---|---|---|---|
| 1001 | 2 | 45 | 120 | 160 | −120 |
| 1002 | 5 | 46 | 120 | 160 | −120 |
| 1003 | 10 | 46 | 110 | 160 | −110 |
| 1004 | 15 | 46 | 110 | 150 | −110 |
| 1005 | 20 | 46 | 110 | 150 | −110 |
| 1006 | 25 | 46 | 110 | 150 | −110 |
| 1007 | 30 | 45 | 100 | 150 | −100 |
| 1008 (comp.) | 1* | 45 | 130 | 180 | −120 |
| 1009 (comp.) | 35* | 35 | — | 100 | −100 |

MF: magnetic field
*: deviations from the inventive scope

TABLE 11

Magnetic Field Modulation
$A_1$ = DyFe, $R_2$ = TbFeCo, and $I_{12}$ = TbFeCo Nitride*

| Sample No. | $I_{12}$ Thickness (nm) | S/N (dB) | Enlarging MF (Oe) | Inverting MF (Oe) | Erasing MF (Oe) |
|---|---|---|---|---|---|
| 1101 (comp.) | 2 | 42 | 80 | 110 | −80 |
| 1102 (comp.) | 5 | 43 | 70 | 110 | −70 |
| 1103 (comp.) | 10 | 43 | 70 | 100 | −70 |
| 1104 (comp.) | 15 | 43 | 60 | 100 | −60 |
| 1105 (comp.) | 20 | 42 | 60 | 90 | −60 |
| 1106 (comp.) | 25 | 42 | 50 | 80 | −50 |
| 1107 (comp.) | 30 | 42 | 50 | 80 | −50 |
| 1108 (comp.) | 1* | 40 | 100 | 130 | −100 |
| 1109 (comp.) | 35* | 25 | — | 50 | −50 |

MF: magnetic field
*: deviations from the inventive scope

TABLE 12

Magnetic Field Modulation
$A_1$ = DyFe, $R_2$ = TbFeCo, and $I_{12}$ = Si Nitride*

| Sample No. | $I_{12}$ Thickness (nm) | S/N (dB) | Enlarging MF (Oe) | Inverting MF (Oe) | Erasing MF (Oe) |
|---|---|---|---|---|---|
| 1201 (comp.) | 2 | 41 | 80 | 110 | −80 |
| 1202 (comp.) | 5 | 41 | 70 | 110 | −70 |
| 1203 (comp.) | 10 | 41 | 70 | 100 | −70 |
| 1204 (comp.) | 15 | 42 | 60 | 100 | −60 |
| 1205 (comp.) | 20 | 42 | 60 | 90 | −60 |
| 1206 (comp.) | 25 | 42 | 50 | 80 | −50 |
| 1207 (comp.) | 30 | 42 | 50 | 80 | −50 |
| 1208 (comp.) | 1* | 41 | 100 | 130 | −100 |
| 1209 (comp.) | 35* | 28 | — | 50 | −50 |

MF: magnetic field
*: deviations from the inventive scope

TABLE 13

Magnetic Field Modulation, and Exchange Coupling*
$A_1$ = DyFe, $R_2$ = TbFeCo, and $I_{12}$ = GdFeCo

| Sample No. | $I_{12}$ Thickness (nm) | S/N (dB) | Enlarging MF (Oe) | Inverting MF (Oe) | Erasing MF (Oe) |
|---|---|---|---|---|---|
| 1301 (comp.) | 2 | 47 | 150 | 200 | −150 |
| 1302 (comp.) | 5 | 47 | 140 | 180 | −140 |
| 1303 (comp.) | 10 | 47 | 140 | 180 | −140 |
| 1304 (comp.) | 15 | 47 | 140 | 180 | −140 |
| 1305 (comp.) | 20 | 47 | 130 | 180 | −130 |
| 1306 (comp.) | 25 | 47 | 130 | 180 | −130 |
| 1307 (comp.) | 30 | 47 | 120 | 170 | −120 |
| 1308 (comp.) | 1* | 47 | 150 | 200 | −150 |
| 1309 (comp.) | 35* | 47 | 120 | 170 | −120 |

MF: magnetic field
*: deviations from the inventive scope

Each of the samples shown in Tables 1 to 7 includes an nonmagnetic intermediate layer comprising an oxide, and makes use of magnetostatic coupling, with the amplifying layer $A_1$ containing Dy as the rare earth metal element. Of these samples, the inventive samples having a nonmagnetic intermediate layer thickness of 2 to 30 nm have a small absolute value for the enlarging magnetic field, inverting magnetic field, and erasing magnetic field, and show quite enough S/N. On the other hand, the samples having a nonmagnetic intermediate layer thickness deviating from the inventive scope have a large absolute value for at least one of the enlarging magnetic field, inverting magnetic field, and erasing magnetic field, and show greatly reduced S/N because the copied magnetic domains are not enlarged.

Each of the samples shown in Table 13 includes a magnetic intermediate layer, and makes use of exchange coupling. These samples are much larger in the absolute value for the enlarging magnetic field, inverting magnetic field, and erasing magnetic field than the inventive samples.

The samples shown in Tables 8 to 10 are the same as those shown in Tables 1 to 3 with the exception that the amplifying layer $A_1$ contains Gd as the rare earth metal element. These samples are somewhat improved over the samples shown in Table 13, which are of the type that makes use of exchange coupling. However, the replacement of Dy by Gd makes absolute values for the enlarging magnetic field, inverting magnetic field, and erasing magnetic field too large, and causes some considerable S/N drop.

The samples shown in Tables 11 to 12 are the same as those shown in Table 2 with the exception that the nonmagnetic intermediate layer is formed of a nitride. As can be seen from the tables, the replacement of the oxide by the nitride causes some remarkable S/N drop.

Example 2

(Light Modulation Reading)

Samples shown in the following tables were prepared as in Example 1 with the exception that the composition of each magnetic layer was controlled in such a manner as to make light modulation reading feasible.

Evaluation of Characteristics

The properties of these samples were evaluated with an optical disk-evaluating device under the following conditions:

Recording Conditions

Laser wavelength: 680 nm

Numerical aperture NA: 0.55

Recording power: 10 mW

Recording magnetic field: 300 Oe (an alternating magnetic field having a frequency of 2 MHz)

Linear velocity: 2 m/s

Reading Conditions (Light Modulation)

Laser wavelength: 680 nm

Numerical aperture NA: 0.55

Reading power: a laser beam pulse modulated at a frequency of 4 MHz (with a bottom power of 1.0 mW and a duty ratio of 50%)

Reading magnetic field: a DC magnetic field of 50 Oe

Linear velocity: 2 m/s

Reading was carried out with varying reading power (top power) to find S/N upon irradiation with "enlarging power" and "inverting power", and with "enlarging power". The results are enumerated in the following tables.

By the term "enlarging power" is intended laser beam power whereby the recorded magnetic domains can be copied to the amplifying layer, and the thus copied magnetic domains can be enlarged. In another parlance, the term "enlarging power" refers to power with which S/N reaches a maximum.

By the term "inverting power" is intended laser beam power whereby S/N is again brought down to less than 30 dB upon an increase of the top power from the enlarging power.

It is noted that when the copied magnetic domains are not enlarged, only the maximum value for S/N and inverting power are shown.

TABLE 14

Light Modulation
$A_1$ = DyFeCo, $R_2$ = TbFeCo, and $I_{12}$ = TbFeCo Oxide

| Sample No. | $I_{12}$ Thickness (nm) | S/N (dB) | Enlarging Power (mW) | Inverting Power (mW) |
|---|---|---|---|---|
| 1401 | 2 | 47 | 3.5 | 5.0 |
| 1402 | 5 | 48 | 3.4 | 4.8 |
| 1403 | 10 | 48 | 3.3 | 4.8 |
| 1404 | 15 | 48 | 3.3 | 4.7 |
| 1405 | 20 | 48 | 3.2 | 4.7 |
| 1406 | 25 | 48 | 3.1 | 4.6 |
| 1407 | 30 | 47 | 3.0 | 4.5 |
| 1408 (comp.) | 1* | 47 | 4.0 | 6.0 |
| 1409 (comp.) | 35* | 35 | — | 3.0 |

*: deviations from the inventive scope

TABLE 15

Light Modulation
$A_1$ = DyFeCo, $R_2$ = TbFeCo, and $I_{12}$ = Si Nitride*

| Sample No. | $I_{12}$ Thickness (nm) | S/N (dB) | Enlarging Power (mW) | Inverting Power (mW) |
|---|---|---|---|---|
| 1501 (comp.) | 2 | 42 | 3.5 | 5.0 |
| 1502 (comp.) | 5 | 43 | 3.5 | 5.0 |
| 1503 (comp.) | 10 | 43 | 3.4 | 4.9 |
| 1504 (comp.) | 15 | 43 | 3.4 | 4.9 |
| 1505 (comp.) | 20 | 43 | 3.3 | 4.8 |
| 1506 (comp.) | 25 | 42 | 3.3 | 4.7 |
| 1507 (comp.) | 30 | 42 | 3.3 | 4.6 |
| 1508 (comp.) | 1* | 42 | 4.0 | 6.0 |
| 1509 (comp.) | 35* | 35 | — | 3.0 |

*: deviations from the inventive scope

Each of the samples shown in Table 14 includes a nonmagnetic intermediate layer comprising an oxide, and makes use of magnetostatic coupling, with the amplifying layer $A_1$ containing Dy as the rare earth metal element. Of these samples, the inventive samples having a nonmagnetic intermediate layer thickness of 2 to 30 nm are reduced in terms of both the enlarging power and the inverting power, and show quite enough S/N. However, the samples having a nonmagnetic intermediate layer thickness deviating from the inventive scope show remarkably reduced S/N because the enlarging power, and inverting power are increased or the copied magnetic domains are not enlarged.

The samples shown in Table 15 are the same as those shown in Table 14 with the exception that the nonmagnetic intermediate layers are each constructed of a nitride. As can be seen from Table 15, the replacement of the oxide by the nitride causes some considerable S/N drops.

Japanese Patent Application No. 194809/1997 is herein incorporated by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A magneto-optical recording medium, which comprises:

a substrate, and a magnetic multilayer on a surface side of said substrate, said magnetic multilayer comprising an amplifying layer and a recording layer which are laminated together and are each a magnetic layer, with a nonmagnetic intermediate layer interleaved therebetween, said amplifying layer and said recording layer being magnetostatically coupled together, and said nonmagnetic intermediate layer being made up of a metal oxide and having a thickness of 2 to 30 nm.

2. The magneto-optical recording medium according to claim 1, wherein said amplifying layer is mainly composed of dysprosium and iron, and said recording layer is mainly composed of at least one element selected from a group consisting of gadolinium, terbium, dysprosium and iron.

3. The magneto-optical recording medium according to claim 1, wherein said amplifying layer is mainly, composed of dysprosium, iron and cobalt and said recording layer is mainly composed of at least one element selected from a group consisting of gadolinium, terbium, dysprosium, iron and cobalt.

4. The magneto-optical recording medium according to claim 1, wherein said amplifying layer is mainly composed of dysprosium and iron, and said recording layer is mainly composed of at least one element selected from a group consisting of gadolinium, terbium, dysprosium and iron.

5. A process for reading a magneto-optical recording medium comprising a substrate and a magnetic multilayer on a surface side of the substrate, said magnetic multilayer comprising an amplifying layer and a recording layer laminated together and each including a magnetic layer with a nonmagnetic intermediate layer interleaved therebetween, the amplifying layer and the recording layer being magnetostatically coupled together and the nonmagnetic intermediate layer being made of metal oxide and, the process, comprising the steps of:

forming a recorded magnetic domain by laser beam irradiation and application of a reading magnetic field to the optical recording medium;

copying said recorded magnetic domain to said amplifying layer;

simultaneously enlarging said copied magnetic domain;

reading out said copied magnetic domain; and applying an erasing magnetic field in a direction reverse to said reading magnetic field so that copied magnetic domain diminishes to nil.

6. A process for reading a magneto-optical recording medium comprising a substrate and a magnetic multilayer on a surface side of the substrate, said magnetic multilayer comprising an amplifying layer and a recording layer laminated together and each including a magnetic layer with a nonmagnetic intermediate layer interleaved therebetween, the amplifying layer and the recording layer being magnetostatically coupled together and the nonmagnetic intermediate layer being made of metal oxide and, the process, comprising the steps of:

forming a recorded magnetic domain by laser beam irradiation and application of a reading magnetic field to the optical recording medium;

copying said recorded magnetic domain to said amplifying layer;

interrupting or decreasing the laser beam power to diminish to nil said copied magnetic domain;

simultaneously enlarging said copied magnetic domain;

reading out said copied magnetic domain; and interrupting or decreasing the laser beam power to diminish to nil said copied magnetic domain.

* * * * *